UNITED STATES PATENT OFFICE.

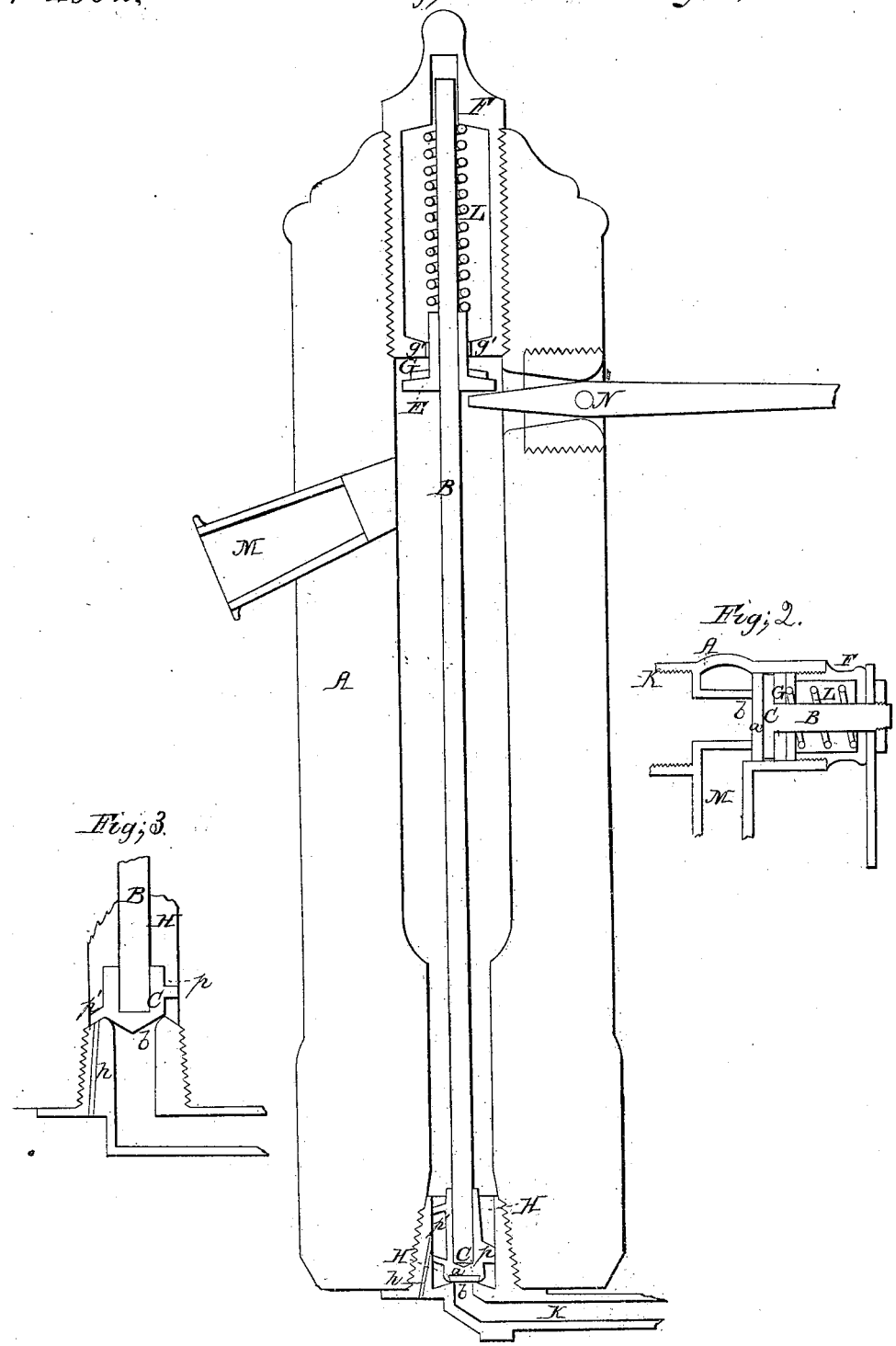

FREDK. H. BARTHOLOMEW, OF NEW YORK, N. Y.

HYDRANT.

Specification of Letters Patent No. 4,692, dated August 12, 1846.

*To all whom it may concern:*

Be it known that I, FREDERICK H. BARTHOLOMEW, of the city, county, and State of New York, have invented new and useful Improvements in Hydrants and Stop-Cocks, and that the following is a full, clear, and exact description of the principle or character which distinguishes them from all other things before known, and of the manner of making, constructing, and using the same, reference being had to the accompanying drawings, making part of this specification, in which—

Figure 1 is a vertical section of a hydrant with my improvements applied thereto, and Fig. 2, a section of my improvement as applied to a stop-cock.

The same letters indicate like parts.

In the construction of hydrants and stop cocks for drawing water under the pressure of a heavy column it has been found very difficult to close the valve by a quick motion on account of the danger of bursting the pipes by suddenly arresting the current or flow of water which produces a concussion proportioned to the height of the head, called the "water ram." To avoid this, recourse has been had to the employment of a screw which closes the valve very slowly; but as hydrants and stop-cocks are mostly used by negligent and thoughtless persons, either they neglect to close the valve or they turn the screw too rapidly at the risk of bursting the pipes. The object of my first improvement is to provide a means of stopping off the water which shall be self acting, and therefore not liable to accident by negligence, and at the same time effectually avoid the bursting of the pipes by the water ram, and this I effect by closing the valve against the current or flow of the water by means of a spring or weight, the tension or gravity of which is greater than the force of the water, but which gradually overcomes it and therefore avoids that sudden concussion which endangers the safety of the pipes, the valve thus closed having the effect of a safety valve to yield to any sudden pressure or concussion which might be too great for the pipes. And my second improvement consists in the peculiar manner of employing a stopper on the side of the valve stem for closing a small water aperture through which is discharged the water contained in the body of the hydrant, to prevent freezing in cold weather, but which may be turned on the stem to prevent the discharge of the waste in warm weather.

In the accompanying drawings (A) represents the body of a hydrant, and (B) the valve stem, the lower end of which has the stopper or valve (C) attached to it, its lower end being lined with a disk of leather (*a*) or made with a ground metallic joint to close the aperture (*b*) of the water pipe (K). The valve seat (*b*) of the water pipe is surrounded by a cylindrical chamber (H) and the valve is guided in it by wings (*p, p'*) the one (*p'*) being sufficiently large to cover the aperture of a waste hole (*h*) which runs down obliquely so that when the valve is open the rush of water shall pass this aperture nearly in the direction of its axis and thus prevent, or nearly so, the escape of water. In warm weather when there is no danger of frost, the wing or flanch (*p'*) is turned so as to cover and close the waste hole when the valve is closed; and in cold weather it is turned from it so as to permit the waste water to escape through it when the valve closes, thus leaving the body of the hydrant entirely free from water. This is done by turning the cap in which the square end of the valve stem works. The upper end of the valve stem (B) is guided by a socket in a metallic cap (F) screwed or otherwise secured to the top of the hydrant. This cap is enlarged within and at its lower end it is contracted by a flanch (*g, g*) which forms an inverted valve seat against which fits a leather washer (G) on a collar (E) attached to the valve stem, so that when the valve is opened this washer is forced up against the valve seat (*g*) to prevent the escape of water at the top. A strong helical spring (L) is placed on the valve stem and acting against the upper part of the cap and the collar of the valve stem to force the valve on its seat; and the valve is opened by a lever (N) which acts against the lower end of the collar (E). Or instead of this the valve stem may extend through the top of the cap, there to be operated in any desired manner. Instead of the spring (L) for forcing and keeping down the valve, a weight may be substituted, although I prefer the spring.

The discharge spout (M) may be made and placed in any desired manner. The valve seat, valve, and waste hole may be variously arranged without changing the principle of my invention: one modification will be seen at Fig. 3 with a ground metallic valve.

The mode of applying my first improvement to the simple form of a stop-cock is represented in Fig. 2, where (A) is the body of the cock, (K) that part of it which screws onto the vessel from which the water or other liquid is to be drawn; (M), the discharge spout; (b), the valve seat; (C) the valve lined with leather (a); (B) the valve stem; (L) the helical spring around it; (F) the cap, and (G) the leather ring which closes up the aperture of the cap to prevent the escape of the water through it when the valve is opened, and which in this instance is placed on the top of the valve (C), which in this modification answers the purpose of the collar in the hydrant.

I am aware that helical springs have been used to close the valves of hydrants and stop-cocks, but heretofore these have been employed to close the valve in the direction of the flow of water and not against it, and therefore could not produce the effect intended and accomplished by me. And I am also aware that hydrants have been made with a waste hole for the discharge of the waste water after the closing of the valve; but these have been so made as to render it necessary to open the waste hole on closing the valve and without the means of closing it when the valve is closed in which case it is not desirable to carry off the water left in the body of the hydrant.

What I claim, therefore, as my invention, and desire to secure by Letters Patent, is—

1. The method, substantially as herein described, of closing the valve of a hydrant or stop-cock by a spring or its equivalent against the flow or pressure of the water, or other liquid, whereby I am enabled to prevent any injurious result from the water ram, as described.

2. And I also claim making the waste hole of the hydrant oblique, in combination with the shifting stopper, substantially as herein described, whereby the flow of water is prevented, or nearly so, while the valve is opened, and the water within the body of the hydrant retained or discharged when the main valve is closed, as described.

F. H. BARTHOLOMEW.

Witnesses:
Jas. P. Howard,
W. Adams.